United States Patent [19]

Obermoller

[11] 4,082,239
[45] Apr. 4, 1978

[54] ALL ELECTRICAL SELF-CONTAINED FUEL CONTROL SYSTEM FOR A BURNER IN A THERMAL AIRSHIP

[75] Inventor: Douglas B. Obermoller, Sioux Falls, S. Dak.

[73] Assignee: Raven Industries, Inc., Sioux Falls, S. Dak.

[21] Appl. No.: 675,953

[22] Filed: Apr. 12, 1976

[51] Int. Cl.² ............................................. B64B 1/62
[52] U.S. Cl. ............................................. 244/98; 244/30
[58] Field of Search ............... 244/30, 31, 96, 97, 244/98, 128; 236/10; 432/222; 431/44

[56] References Cited

U.S. PATENT DOCUMENTS

| 3,170,658 | 2/1965 | Yost | 244/98 |
| 3,174,534 | 3/1965 | Weber | 431/44 |
| 3,881,863 | 5/1975 | Creuz | 432/222 |

FOREIGN PATENT DOCUMENTS

| 154,457 | 12/1920 | United Kingdom | 244/97 |
| 1,295,927 | 11/1972 | United Kingdom | 244/97 |

*Primary Examiner*—Barry L. Kelmachter
*Attorney, Agent, or Firm*—Hill, Gross, Simpson, Van Santen, Steadman, Chiara & Simpson

[57] ABSTRACT

A thermal airship having a hull formed of an elongate soft envelope of flexible material being aerodynamic shaped for horizontal flight with tail members at the aft end for controlling the direction of horizontal flight and a gondola carried below the hull with a power propelling member for driving the airship horizontally and a pressurizing inflation opening in the base of the envelope with a hot air pressure generating system for superpressurizing the envelope and a controlled fuel operated burner for heating the air coming into the envelope and a thermocouple suspended within the envelope near the top but spaced from the outer wall with a variable control for the thermocouple controlling the fuel valve for the burner so as to maintain the hot air within the envelope at a predetermined controlled temperature.

10 Claims, 3 Drawing Figures

U.S. Patent      April 4, 1978      4,082,239
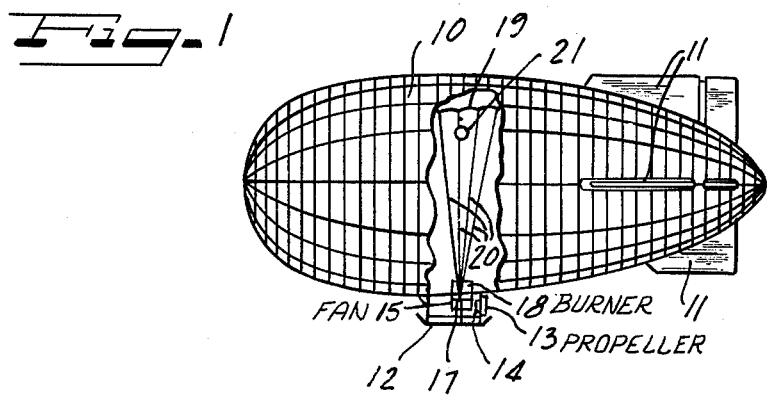
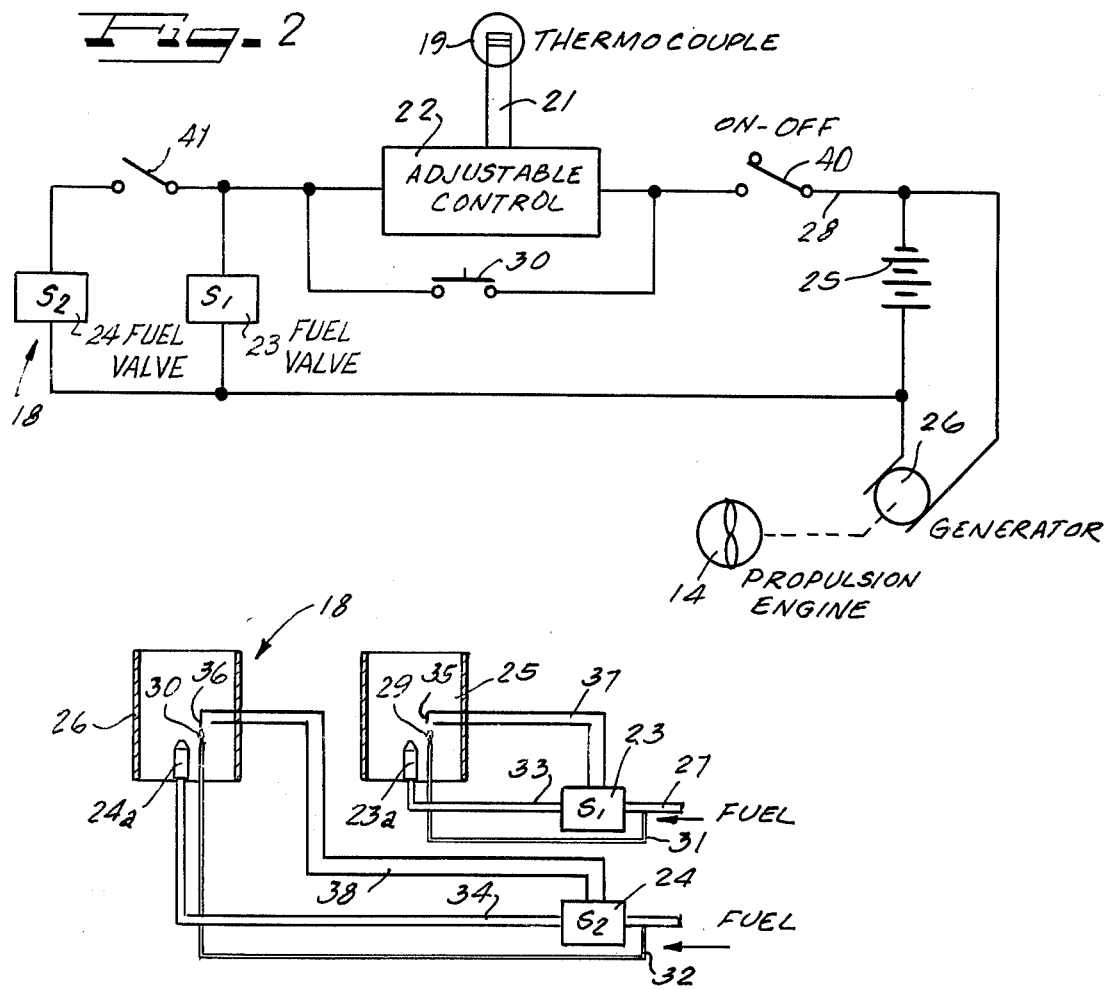

ALL ELECTRICAL SELF-CONTAINED FUEL CONTROL SYSTEM FOR A BURNER IN A THERMAL AIRSHIP

BACKGROUND OF THE INVENTION

The invention relates to improvements in powered airships and more particularly to a powered airship having a flexible soft envelope inflated and pressurized by hot air and capable of directed flights for transporting loads over distances and employing an improved arrangement for controlling the free lift of the airship.

Airships of this type have been referred to as dirigibles and originally referred to as blimps when the airship is nonrigid. The present invention in particular relates to a hot air inflated airship of the nonrigid pressure type. The main envelope or pressure hull is formed of a fabric such as a laminated plastic and Dacron, or of suitable other material which is lightweight, high temperature resistant, extremely strong and impermeable to gas leakage. The envelope of the airship is horizontally elongate and is primarily symmetrical with load lines distributed over the body of the envelope for carrying a payload therebelow. The load lines are also particularly arranged to support hot gas pressure inflation means which preferably will be in the form of one or more propane fueled burners with a fan inflation means. The fan or blower which pressurizes the airship is driven by a suitable motor which may be propane or gasoline fueled. The airship carries a propelling engine and is propeller driven to travel in controlled horizontal flight.

The plastic fabric envelope when not in use can be folded and shipped or stored in the space which takes up less than 1% of its inflated volume. The envelope can be relatively rapidly inflated by the operation of the fan and the free lift is controllable by control of the burner which controls the temperature of the air within the envelope. The direction of flight is controlled by tail fins at the aft end of the airship envelope. These tail surfaces preferably include a rigid or stable portion which stabilizes the airship in horizontal flight, and a manipulable portion which changes the direction of flight. Vertically extending control surfaces are pivoted to the left or right to change the direction of flight, and horizontally extending surfaces move up or down to cause the airship to ascend or descend. Primarily, the temperature of the hot air within the airship is controlled to provide sufficient lift for the weight of the envelope and the payload being carried so that essentially free lift is present while the airship is in flight, and it ascends or descends in accordance with the change in angle of the control tail surfaces.

The envelope is maintained under superpressure by a constantly operated fan driven by an engine, and the fan is supported on the gondola and blows air upwardly past a controlled burner system which is uniquely regulated to regulate the temperature of the air within the envelope. This air temperature is important inasmuch as it determines the free lift of the airship for carrying the payload. The gondola which carries the pilot and the controls and which also supports the inflation mechanism as well as the engine for driving the fan for moving the structure horizontally is supported on cables which extend downwardly from the top of the envelope through the hollow hull to be attached to the top of the gondola. In accordance with the features of the present invention, a thermocouple is supported on one of the cables preferably directly above the inflation fan and burner, but a substantial distance thereabove, and also the thermocouple is spaced from the wall of the envelope so that temperatures outside of the envelope do not have a direct effect on its reading. The thermocouple sends a signal down to a control box accessible to the pilot within the gondola, and the control box is wired to regulate and control a valve supplying the burner. In flight the operator, who knows the amount of payload carried by the airship sets the temperature within the airship accordingly so that the correct free lift will be maintained for supporting the airship in level flight.

Accordingly, it is an object of the present invention to provide an improved inflatable hot air airship which is capable of closely regulated lift by controlling the temperature within the airship hull.

A further object of the invention is to provide an improved burner control arrangement for a hot air airship which obviates difficulties heretofore encountered in other airships.

A still further object of the invention is to provide a unique and improved hot air supply control for a thermal airship which is capable of maintaining the free lift in the airship for normal flight and which is capable of supplying additional free lift for emergency conditions and which provides safety factors not heretofore available.

Other objects, advantages and features will become more apparent as will equivalent structures which are intended to be covered herein, with the teaching of the principles of the invention in connection with the disclosure of the preferred embodiment in the specification, claims and drawing, in which:

DRAWINGS

FIG. 1 is a side elevational view of an airship with thermal controls constructed and operating in accordance with the principles of the present invention;

FIG. 2 is a schematic illustration of a control arrangement in accordance with the invention; and FIG. 3 is a schematic illustration of the valve control for the burners for the airship.

DESCRIPTION

As illustrated in FIG. 1, a thermal hot air airship is shown having an aerodynamically shaped envelope 10 which provides the hull. At the aft end of the envelope are tail surfaces 11 which are controllable so as to control the direction of flight and control cables, not shown, will lead down within the envelope to a gondola 12 which is suspended beneath the envelope. Support cables 20 extend downwardly within the envelope to carry the gondola, and these cables are attached at their upper ends to the envelope.

For propelling the airship horizontally in flight, a drive propeller 13 is supported on the gondola driven by an engine 14. At the base of the envelope is an opening, and supported on the gondola and mounted within this opening is a hot air pressure generating means 18. The hot air pressure generating means includes a continually operating fan 15 which moves air upwardly past a burner assembly 18. The burner assembly is supplied with fuel from a tank carried on the gondola and is controlled by regulated valves as will become more clear from the description of FIGS. 2 and 3.

Within the gondola is a manual control arrangement 17 which is operated by the pilot in the gondola. From his position, the pilot sets the temperature at which the hot air in the airship envelope is to be maintained by control of the fuel flow of the burner. The pilot also has a control which provides a manual override so that at anytime he wants to increase the temperature of the air within the airship to increase the free lift, he may do so irrespective of the temperature control mechanism. The pilot also is provided with a control whereby he can increase the burner capacity. For this purpose, two burners are arranged and this control permits him to cut in the second burner, for either the automatic operation or for his manual override operation.

An important feature of maintaining the temperature of the air within the airship is by the provision of a thermocouple 19 which is shown in FIG. 1 mounted near the top of the hull, but spaced downwardly from the outer wall so that the temperature of the envelope skin does not radiate a false signal to the thermocouple. Thus, the thermocouple registers the condition of the continually circulating air within the envelope near the top of the airship envelope. For this purpose, it is preferably located directly above the inflation assembly mechanism 17. The thermocouple 19 is preferably secured, such as by being taped to one of the support cables 20 extending downwardly within the envelope. From the thermocouple extend wires 21 leading down to the control box 22, FIG. 2. The pilot sets the adjustable control 22 either by a chart which would show the proper temperature for the payload which is being carried, or by his skill and knowledge of conditions. The control circuitry includes an on/off switch 40 which completes the circuit through the control 22 by wires 28 leading from a battery 25. Power to maintain the battery charged is supplied by a generator 26 operated by the engine 14 which drives the propelling fan. The propelling fan will normally operate continually during flight, although under certain conditions, it may be shut off for coasting or stationary conditions of the airship.

From the power source 25 extends the positive lead 28 and the negative leads 27, both of which connect to the solenoid operated fuel valves 23 and 24 and for the burners 23a and 24a, FIG. 3.

When the burner valve 23 is energized by completion of the circuit from the battery through the adjustable control 22, fuel will flow to the burner 23a. A constantly burning pilot 29 is provided in the burner for safety reasons to avoid flame-outs. Additionally, there is an electrical igniter 35 which is connected by leads 37 to the same circuit which operates the valve 23. Thus, as soon as the valve is opened, the electrical igniter 35 operates. Each of the burners has an igniter with the igniter shown at 36 for the burner 24a, and the igniters are preferably in the form of a sparkplug with suitable electrical equipment connected to the plug and energy supplied from the battery 25.

The second burner 24a is connected to the fuel supply and is provided with a pilot burner 30 the same as the first burner. Each of the burners are preferably constructed with an annular housing 25 and 26 surrounding them. The second burner has electrical connections 38 leading to the igniter 36. Fuel supply lines 31 and 32 lead to the pilot valves 29 and 30 for the burners respectively to maintain the pilot lights in continuous operation. Fuel lines 33 and 34 lead from the controlled solenoid valves 23 and 24 to feed fuel to the burners. The burners are preferably operated by fuel such as propane supplied by tanks carried on the gondola.

Thus, in operation, the pilot will turn on the main burner by manually setting the adjustable control 22 to the predetermined temperature. The main burner 23a will operate until the predetermined temperature is reached as signaled by the thermocouple 19, and at that point, the fuel supply will shut off. For initial inflation, the second or redundant burner will be placed in the circuit by closing the switch 41. This second burner can also be used in emergency situations when a sudden increase in free lift is desired, such as might occur in adverse weather situations. A manual override switch 30 is provided whereby the operator can merely press a button to bypass the adjustable control 22, and the burner will continue to operate while the manual override switch is held closed.

Thus, it will be seen that the unit provides for automatic control of the free lift within the airship envelope in accordance with the direct measure of the temperature of the hot air within the envelope at the location where the temperature is of most significance. Usually, the pilot can set the adjustable control at the beginning of flight, and it will not require his attention during the entire flight.

I claim as my invention:

1. A thermal airship comprising in combination:
   an elongate gas envelope of soft flexible material being aerodynamically shaped for horizontal flight providing an outer wall for a hull for the airship;
   tail members on the aft end of the airship for controlling the direction of horizontal flight;
   a gondola carried below the hull for supporting a payload;
   power propelling means supported by the hull for propelling the airship horizontally;
   means defining a pressurized inflation opening leading into the hull;
   hot air pressure generating means carried on the hull for pressurizing the soft envelope with heated air during flight including an engine continually driving a blower positioned for moving a flow of air through the opening for inflating the envelope with a superpressure;
   a first controlled fuel operated burner positioned in the path of air flow heating the air passing into the envelope interior;
   a valve for controlling the flow of fuel to the burner;
   a thermally responsive device positioned within the envelope spaced inwardly from the envelope wall connected to control said valve and being adjustable to open and close the valve to maintain the temperature within the hull within a predetermined range to provide a predetermined free lift for carrying the payload; and
   a manual override located in the gondola connected to bypass said thermally responsive device and connected to the valve to open the valve and operate the burner independently of the thermally responsive device to provide additional free lift by increasing the temperature within the envelope.

2. A thermal airship constructed in accordance with claim 1:
   including a variable control connected between the thermally responsive device and the valve, located on the gondola for selectively controlling the temperature of heated air within the envelope.

3. A thermal airship constructed in accordance with claim 1:
   wherein said thermally responsive device includes a thermocouple mounted within the envelope directly above the hot air pressure generating means and adjacent a top side of the envelope.

4. A thermal airship constructed in accordance with claim 1:
wherein said thermally responsive device includes a thermocouple within the airship envelope spaced inwardly from the envelope wall and connected to transmit a signal to an adjustable control located in the gondola and connected to the valve for turning the valve off and on within a predetermined setable temperature range.

5. A thermal airship constructed in accordance with claim 1:
including an electrical ignition in the burner connected to be operated simultaneously with opening the valve and controlled by the thermally responsive device.

6. A thermal airship constructed in accordance with claim 5:
and including a safety pilot light within the burner augmenting the electrical ignition.

7. A thermal airship constructed in accordance with claim 1:
and including a second controlled fuel operated burner connected in parallel with the first burner and operated simultaneously with said first burner by the thermally responsive device.

8. A thermal airship comprising in combination:
an elongate gas envelope of soft flexible material being aerodynamically shaped for horizontal flight providing an outer wall for a hull for the airship;
tail members on the aft end of the airship for controlling the direction of horizontal flight;
a gondola carried below the hull for supporting a payload;
power propelling means supported by the hull for propelling the airship horizontally;
means defining a pressurized inflation opening leading into the hull;
hot air pressure generating means carried on the hull for pressurizing the soft envelope with heated air during flight including an engine continually driving a blower positioned for moving a flow of air through the opening for inflating the envelope with a superpressure;
a first controlled fuel operated burner positioned in the path of air flow heating the air passing into the envelope interior;
a valve for controlling the flow of fuel to the burner;
a thermally responsive device positioned within the envelope spaced inwardly from the envelope wall connected to control said valve and being adjustable to open and close the valve to maintain the temperature within the hull within a predetermined range to provide a predetermined free lift for carrying the payload;
a second controlled fuel operated burner connected in parallel with the first burner and operated simultaneously with said first burner by the thermally responsive device; and
a selector control switch for selectively operating only the first burner or both the first and second burners.

9. A thermal airship comprising in combination:
an elongate gas envelope of soft flexible material being aerodynamically shaped for horizontal flight providing an outer wall for a hull for the airship;
tail members on the aft end of the airship for controlling the direction of horizontal flight;
a gondola carried below the hull for supporting a payload;
power propelling means supported by the hull for propelling the airship horizontally;
means defining a pressurized inflation opening leading into the hull;
hot air pressure generating means carried on the hull for pressurizing the soft envelope with heated air during flight including an engine continually driving a blower positioned for moving a flow of air through the opening for inflating the envelope with a superpressure;
a controlled fuel operated burner positioned in the path of air flow heating the air passing into the envelope interior;
a valve for controlling the flow of fuel to the burner;
a thermally responsive device positioned within the envelope spaced inwardly from the envelope wall connected to control said valve and being adjustable to open and close the valve to maintain the temperature within the hull within a predetermined range to provide a predetermined free lift for carrying the payload; and
a generator operated by said power propelling means and connected to said thermally responsive device for supplying power thereto.

10. A thermal airship comprising in combination:
an elongate gas envelope of soft material being aerodynamically shaped for horizontal flight providing an outer wall for a hull for the airship;
tail members on the aft end of the airship for controlling the direction of horizontal flight;
a gondola carried below the hull for supporting a payload;
power propelling means supported by the hull for propelling the airship horizontally;
means defining a pressurized inflation opening leading into the hull;
hot air pressure generating means carried on the hull for pressurizing the soft envelope with heated air during flight including an engine continually driving a blower positioned for moving a flow of air through the opening for inflating the envelope with a superpressure;
a controlled fuel operated burner positioned in the path of air flow heating the air passing into the envelope interior;
a valve for controlling the flow of fuel to the burner;
and a thermally responsive device positioned within the envelope spaced inwardly from the envelope wall connected to control said valve and being adjustable to open and close the valve to maintain the temperature within the hull within a predetermined range to provide a predetermined free lift for carrying the payload;
cables extending downwardly from the top of the envelope for supporting the gondola therebeneath; and
said thermally responsive device including a thermocouple supported on the cables.

* * * * *